(12) United States Patent
Salani et al.

(10) Patent No.: US 7,133,813 B2
(45) Date of Patent: Nov. 7, 2006

(54) KNOWLEDGE-BASED SYSTEM AND METHOD FOR AUTOMATED VEHICLE PACKAGING DESIGN

(75) Inventors: Joseph L Salani, Oxford, MI (US); Louis A Rhodes, Farmington Hills, MI (US); Hugh W Cumming, Orion Township, MI (US); Yun Lu, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 773 days.

(21) Appl. No.: 10/372,997

(22) Filed: Feb. 24, 2003

(65) Prior Publication Data

US 2004/0167760 A1 Aug. 26, 2004

(51) Int. Cl.
G06G 7/48 (2006.01)
(52) U.S. Cl. .............................. 703/8; 703/22; 707/203; 707/204
(58) Field of Classification Search .................... 703/1, 703/8, 22; 707/201, 203, 204; 705/26, 1; 29/428, 854, 402.08; 700/117; 180/65.1
See application file for complete search history.

(56) References Cited

U.S. PATENT DOCUMENTS

| | | | | |
|---|---|---|---|---|
| 6,959,475 | B1 * | 11/2005 | Chernoff et al. | 29/402.08 |
| 6,976,307 | B1 * | 12/2005 | Chernoff et al. | 29/854 |
| 2002/0161664 | A1 * | 10/2002 | Shaya et al. | 705/26 |
| 2003/0037427 | A1 * | 2/2003 | Chernoff et al. | 29/428 |
| 2003/0037967 | A1 * | 2/2003 | Chernoff et al. | 180/65.1 |
| 2003/0040827 | A1 * | 2/2003 | Chernoff et al. | 700/117 |
| 2003/0040828 | A1 * | 2/2003 | Chernoff et al. | 700/117 |
| 2003/0040933 | A1 * | 2/2003 | Chernoff et al. | 705/1 |
| 2003/0046802 | A1 * | 3/2003 | Chernoff et al. | 29/428 |

OTHER PUBLICATIONS

Bliss, F.W. Interactive Computer Graphics at Ford Motor Company, Proceedings of the 7th Annual Conference on Computer Graphics and Interactive Techniques, ACM SIGGRAPH '80, Jul. 1980, pp. 218-24.*
Girczyc et al., E. Increasing Design Quality and Engineering Productivity through Design Reuse, 30th ACM/IEEE Design Automation Conference, 1993, pp. 48-53.*

* cited by examiner

Primary Examiner—Russell Frejd
(74) Attorney, Agent, or Firm—Ralph E. Smith

(57) ABSTRACT

A vehicle package design system includes a data store of vehicle packages defined in terms of spatial dimensions relating vehicle hard points. A design engine adaptively renders a vehicle space based on a vehicle package, and, in response to user input defining a required change in a target spatial dimension, alters the target spatial dimension according to the required change, and alters one or more potentially altered spatial dimensions based on alteration of the target spatial dimension. A user interface communicates potentially altered spatial dimensions to the user, including indicating them as potentially altered according to alteration of the target spatial dimension. In further aspects, the user interface is adapted to accept user input expressing a desire whether to allow a potentially altered spatial dimension to change, and the design engine preferentially maintains some potentially altered spatial dimensions while altering other potentially altered spatial dimensions based on the expressed preference.

18 Claims, 6 Drawing Sheets

Figure 3

Validate and Complete Values of the Parameter List

Import Data from the Selection in DVD
- [DVD] Start DVD [Import] Import Available Dimensions from DVD

Front Manikin Input

| Parameter | Value |
|---|---|
| H To Heel/Vertical | 350 |
| Front Torso Angle | 18 |
| Lateral Location | -41.3 |
| Driver Head Room | 1005.1 |
| Forward Up Visibility | 18.4 |
| Forward Down Visibility | 10.9 |
| Driver Shoulder Room | 1598 |
| Driver Hip Room | 1452.4 |
| Steering Wheel Column Angle | 28 |
| Steering Wheel Lateral Dim | -392.8 |
| Driver Belt Height | 323.1 |
| Steering Wheel to Thigh | 89.1 |
| AHP To Steering CL | |
| Driver Head to Siderail Clrnce | 0 |
| H to Ground | |

Rear Manikin #1 Input
☐ Rear Manikin #1

| Parameter | Value |
|---|---|
| Couple Driver - 1st | |
| 1st Rear Torso Angle | 859 |
| 1st Rear Lateral Location | 22 |
| 1st 'H' to Heel/Vertical | 400 |
| 1st Rear Legroom | 333.1 |
| 1st Rear Headroom | 952.9 |
| 1st Rear Shoulder Room | 1706.3 |
| 1st Rear Hip Room | 1643.9 |
| 1st Rear Belt Height | 1717.9 |
| 1st Rear Ankle Angle | 0 |
| Driver and 1st Vertical Offset | 130 |
| 1st Head to Siderail Clrnce | -23 |
| | 0 |

Rear Manikin #2 Input
☐ Rear Manikin #2

| Parameter | Value |
|---|---|
| Couple 1st - 2nd | |
| 2nd Rear Torso Angle | |
| 2nd Rear Lateral Location | |
| 2nd 'H' to Heel/Vertical | |
| 2nd Rear Legroom | |
| 2nd Rear Headroom | |
| 2nd Rear Shoulder Room | |
| 2nd Rear Hip Room | |
| 2nd Rear Belt Height | |
| 2nd Rear Ankle Angle | |
| 1st and 2nd Vertical Offset | |
| 2nd Head to Siderail Clrnce | |

Wheel & Tire Input
☐ Solve For Horizontal Ground Line

| Parameter | Value |
|---|---|
| Front Tire Width | 895 |
| Front Tire Aspect Ratio | 22 |
| Front Wheel Diameter | 355.55 |
| Front Rim Width | 315 |
| Front Static Loaded Radius | 947.5 |
| Rear Tire Width | 973.7 |
| Rear Tire Aspect Ratio | 1577.1 |
| Rear Wheel Diameter | 1244.2 |
| Rear Rim Width | 0 |
| Rear Static Loaded Radius | 130 |
| L101 Wheelbase | -25 |
| CL6 Heel to Front Spindle | 0 |
| W101 Front Track | |
| W102 Rear Track | |
| Front 0 to Ground | |
| Rear 0 to Ground | |

○ OK  ○ Apply  ○ Cancel

KNOWLEDGE-BASED SYSTEM AND METHOD FOR AUTOMATED VEHICLE PACKAGING DESIGN

FIELD OF THE INVENTION

The present invention generally relates to computer-automated product design tools and particularly relates to computer-automated systems and methods of vehicle package design.

BACKGROUND OF THE INVENTION

The process of vehicle packaging is an integral part of the vehicle conceptualization and development process, and directly affects decisions relating to vehicle theme selections. During the vehicle packaging process, designers determine how the vehicle components, including occupants, are fitted into the total vehicle space. Downstream design and engineering changes are often coupled with the packaging results.

It is desirable to employ software technologies to automate the tasks and activities of the vehicle packaging process. It is less desirable, however, to employ software applications that only partially automate the packaging tasks, such as with hard coded applications of process knowledge. Such a software application would not, for example, be adapted to notify a user of potential changes in non-target dimensions based on a required change in the target dimension. Nor would such a software application be adapted to allow a user to express a preference whether to allow a potentially altered spatial dimension to change, and to comply with the expressed preference in an adaptive fashion when altering one or more non-target dimensions in compliance with SAE standards.

The hard coded vehicle package design software would suffer from being unable to adapt to frequent design and engineering changes in an automated fashion. For example, when a user changes the distance from a driver's hip to the driver's heel (H To HeelVertical), the distance between the driver's hip and a first rear passenger's hip (Couple Driver-1st) might automatically change in accordance with SAE standards, while the distance from the first rear passenger's hip to the first rear passenger's heel (1st H To HeelVertical) could remain the same. With the hard coded process, the user would not be able to select to hold the Couple driver-$1^{st}$ constant, while allowing the $1^{st}$H to HeelVertical to change. As a result, a user who wished to frequently change the 1st H To HeelVertical in accordance with a change in the H To HeelVertical, while maintaining the Couple Driver-1st at a constant value in accordance with SAE standards, would have to repeatedly enter new values for both the H To HeelVertical and the 1st H To HeelVertical. This problem would be compounded when combined with a circumstance in which a user wished to frequently change up to 12 dimensions in accordance with SAE standards. The need remains, therefore, for a vehicle package design system and method that is able to adapt to frequent design and engineering changes in an automated fashion. The present invention fulfills this need.

SUMMARY OF THE INVENTION

In accordance with the present invention, a vehicle package design system includes a data store of vehicle packages defined in terms of spatial dimensions relating vehicle hard points. A design engine adaptively renders a vehicle space based on a vehicle package, and, in response to user input defining a required change in a target spatial dimension, alters the target spatial dimension according to the required change, and alters one or more potentially altered spatial dimensions based on alteration of the target spatial dimension. A user interface communicates potentially altered spatial dimensions to the user, indicating them as potentially altered according to alteration of the target spatial dimension. In further aspects, the user interface is adapted to accept user input expressing a preference whether to allow a potentially altered spatial dimension to change, and the design engine preferentially maintains some potentially altered spatial dimensions, while altering other potentially altered spatial dimensions based on the expressed preference.

The present invention is advantageous over previous vehicle package design systems and methods in that users can readily identify potentially altered dimensions and preferentially allow alteration of some dimensions in favor of others. Users can thus change a vehicle package design in a customizable fashion that complies with SAE standards. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description, claims, and the accompanying drawings, wherein:

FIG. 3 is a block diagram depicting a user interface component in accordance with the present invention that is operable to import a digital vehicle package, to output spatial dimensions of the package, and to accept input of spatial dimensions to the package;

FIG. 5 is a block diagram depicting a user interface component in accordance with the present invention that is operable to accept user input identifying a target spatial dimension, identify potentially altered spatial dimensions, accept user input defining a required change to the target dimension, and communicate present and future values of potentially altered spatial dimensions.

DETAILED DESCRIPTION OF THE PREFERRED EMBODIMENTS

The present invention is generally described below with reference to a vehicle package design tool, and is particularly described below with reference to automobile package design. It should be readily understood, however, that the present invention may be implemented in a form for designing vehicle packages of types other than automobile packages. Further, it should be readily understood that the present invention may be implemented in a form for designing product packages of a type other than vehicle packages. Moreover, the description of the preferred embodiment is intended to be illustrative of the present invention, and not to limit the scope of the present invention. Thus, variations that do not depart from the spirit and scope of the present invention are intended to be disclosed herein, and are further claimed as the present invention.

Figure 1:
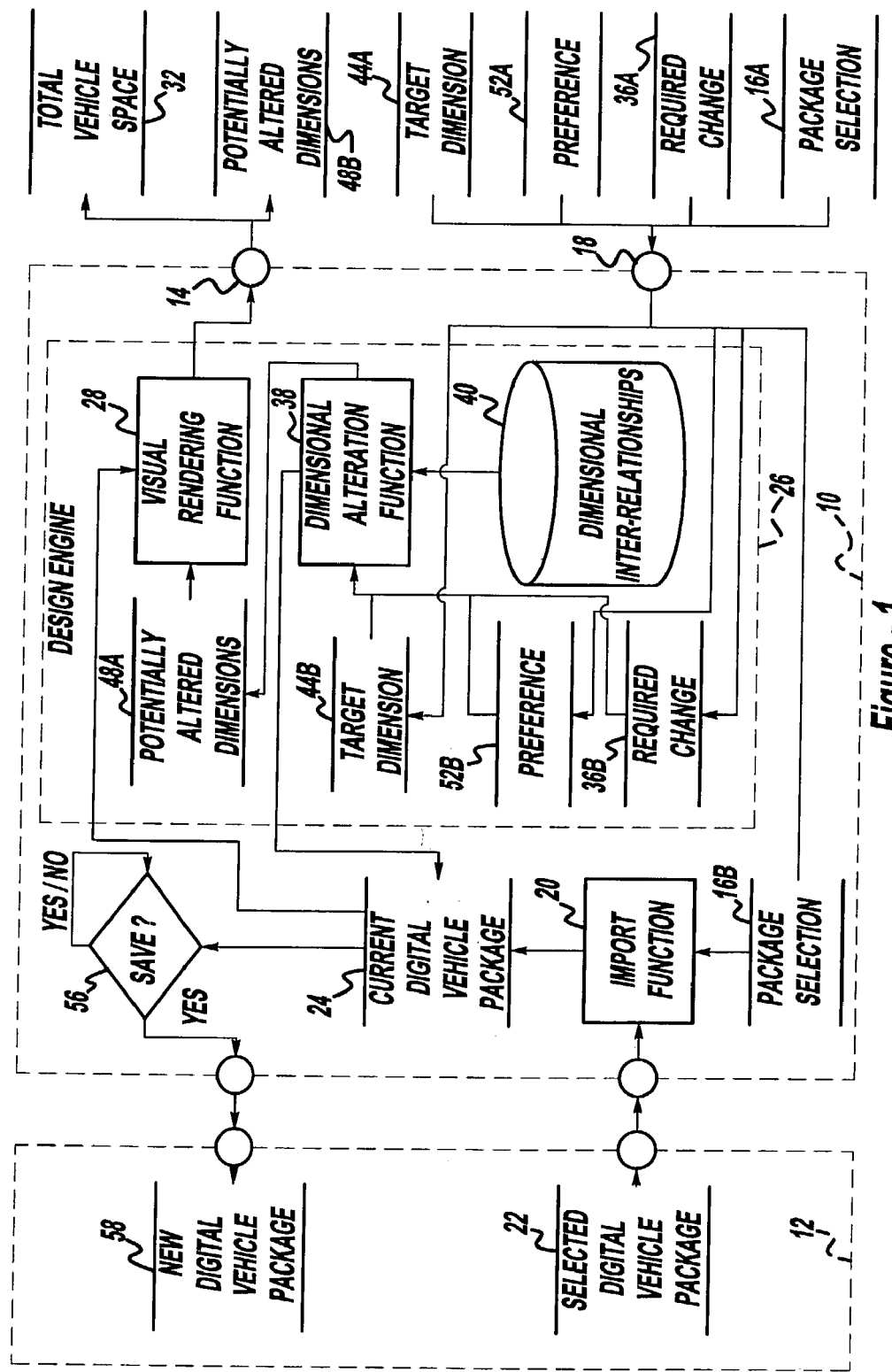
FIG. 1 is a block diagram of a vehicle package design system in accordance with the present invention.
Figure 2:
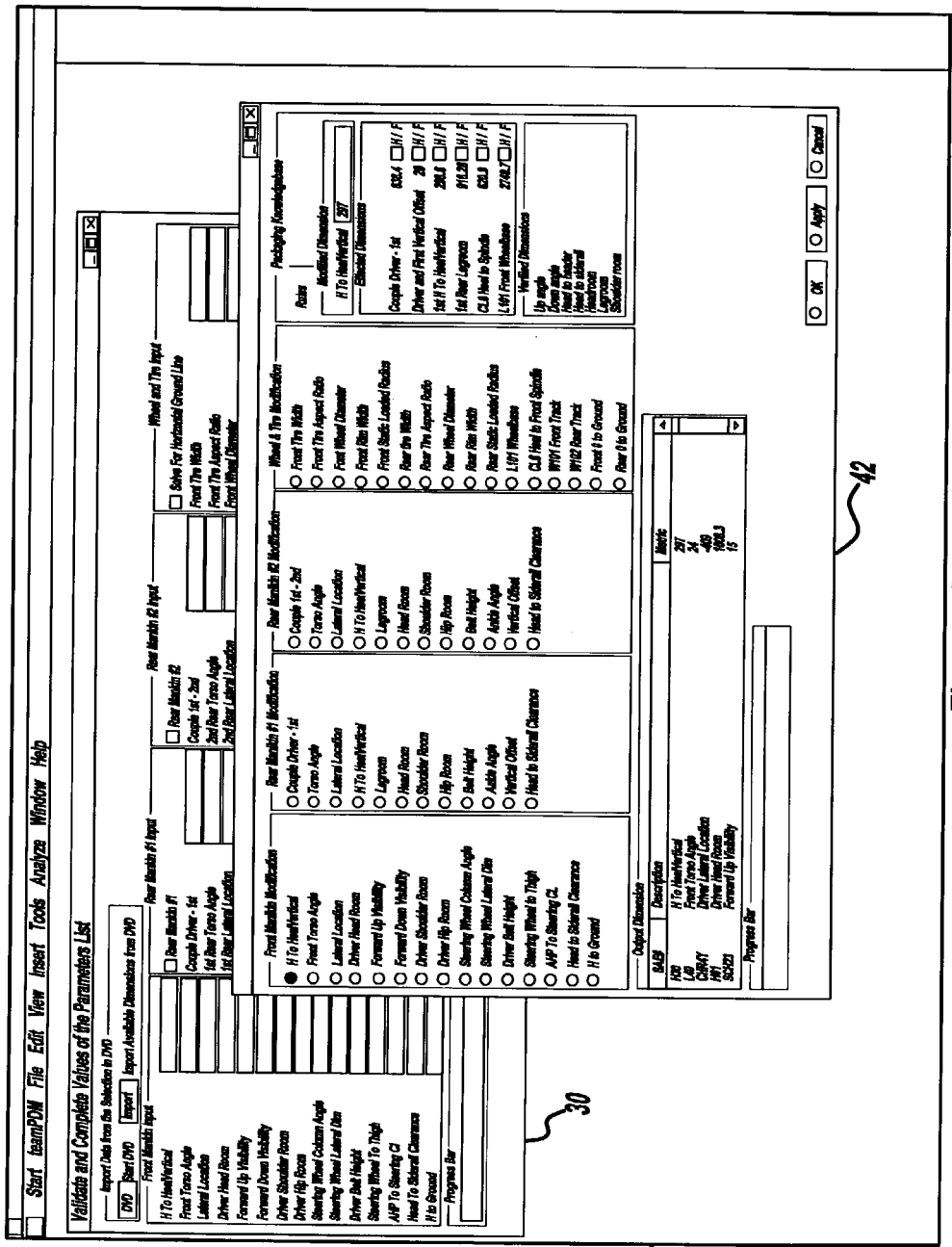
FIG. 2 is a screen shot depicting multiple graphic user interface components in accordance with the present invention.

Referring to FIG. 1, a vehicle package design system 10 communicates with a data store 12 populated with digital vehicle packages defined in terms of spatial dimensions relating vehicle hard points. A user interface of system 10 has an output 14, such as an active display, communicating options to the user in the form of the Graphic User Interface (GUI) components of FIG. 2. Thus, the user can communicate a selection 16A-16B (FIG. 1) of a particular package to system 10 via an input 18 of the user interface, such as a keyboard and mouse. In turn, import function 20 of system 10 imports selected digital vehicle package 22 as current digital vehicle package 24 based on selection 16B.

Figure 4:
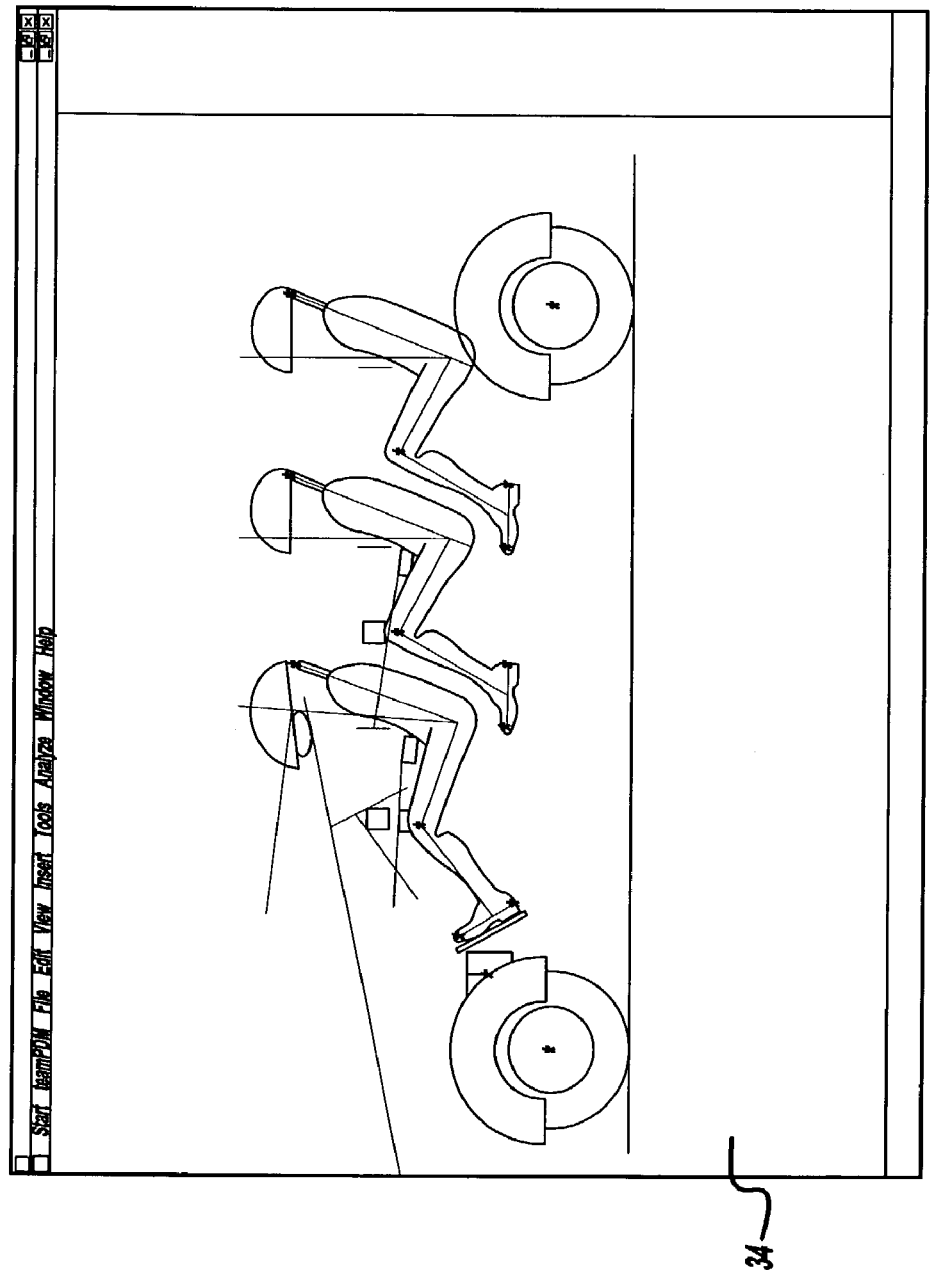
FIG. 4 is a screen shot depicting a total vehicle space rendered to an active display in accordance with the present invention.

Design engine 26 of system 10 has a visual rendering function 28 that visually renders current vehicle design package 24 to the active display in two ways. Firstly, visual rendering function 28 populates inputs of package parameter input GUI component 30 of FIG. 3 according to the parameters (dimensions relating vehicle hard points) of current digital vehicle package 24 (FIG. 1), thereby communicating total vehicle space 32 to the user. Secondly, visual rendering function 28 visually renders total vehicle space 32 to the active display in the form of adaptive spatial display GUI component 34 of FIG. 4. Thus, total vehicle space 32 (FIG. 1) can be effectively communicated to the user in a variety of ways, and the present invention preferably employs multiple communication techniques.

In operation, the user can input a required change 36A-36B to a parameter by typing a new value in a corresponding field text box of GUI component 30 (FIG. 3). Dimension alteration function 38 of design engine 26, in turn, affects changes to current digital vehicle package 24 based on required change 36B and dimensional inter-relationships 40. For example, if required change 36B defines a change to H To HeelVertical, dimension alteration function is operable to alter H To HeelVertical according to required change 36B, and is operable to alter Couple Driver-$1^{st}$ based on required change 36B in accordance with dimensional inter-relationships 40 and the value of $1^{st}$H to HeelVertical. The changed current digital vehicle package is then rendered to the active display as total vehicle space 32 by visual rendering function 28.

Figure 5:
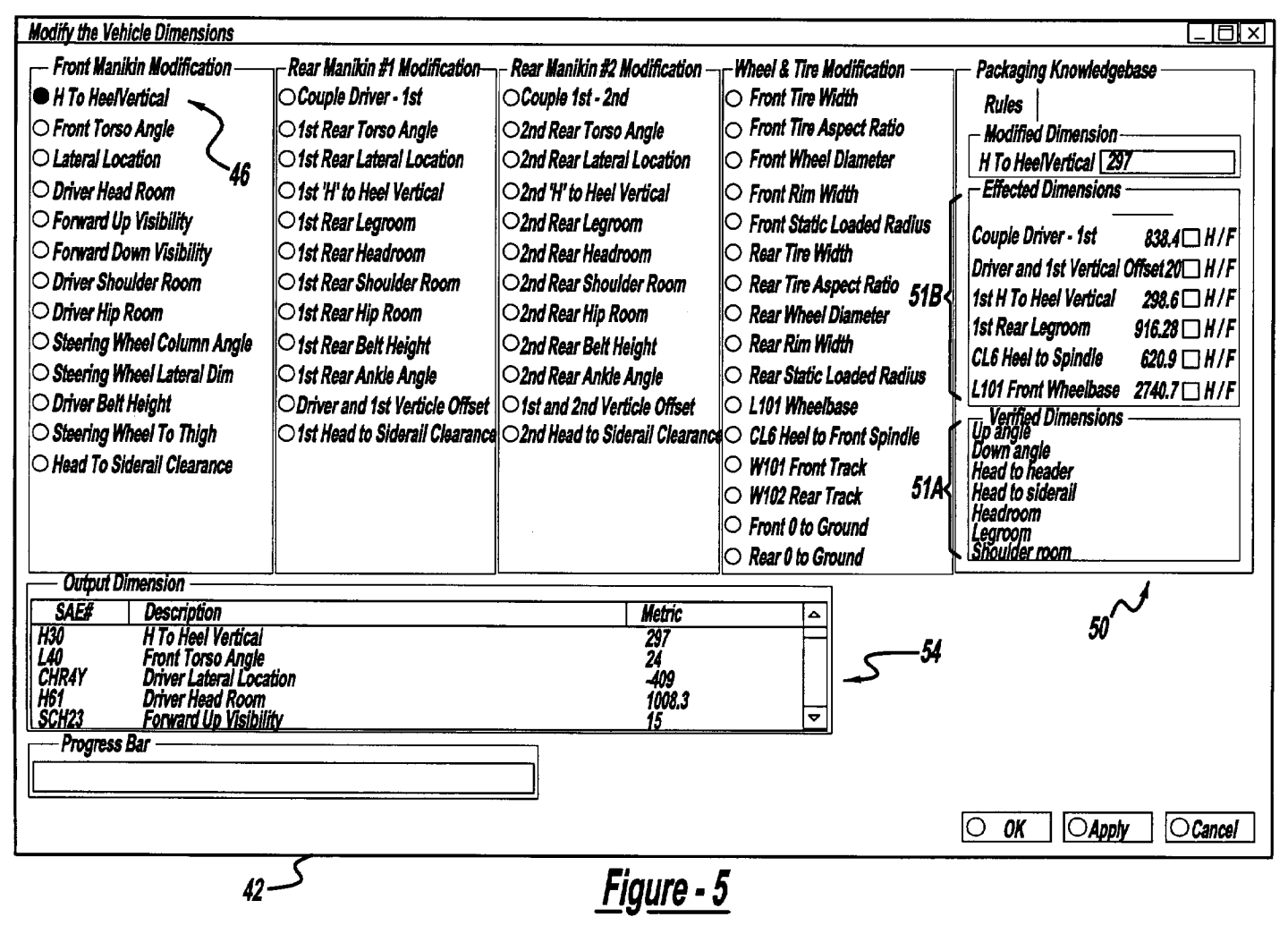

The present invention particularly differs from the prior art by addition of vehicle dimension modification GUI component 42 of FIG. 5. Component 42 allows a user to specify a target dimension 44A-44B (FIG. 1) as at 46 (FIG. 5), where H To HeelVertical has been selected with a mouse click on a corresponding radio button. In turn, dimension alteration function 38 (FIG. 1) is operable to identify potentially altered spatial dimensions 48A-48B based on target dimension 44B and dimensional inter-relationships 40, and communicate them to the user via packaging knowledgebase subcomponent 50 (FIG. 5). Thus, packaging knowledgebase subcomponent 50 of GUI component 42 is operable to communicate modification rules to the user, where the communicated rules are specific to the target dimension.

In a presently preferred embodiment, packaging knowledgebase subcomponent 50 communicates the target dimension to the user along with an opportunity to input a desired change to the target dimension. Packaging knowledgebase subcomponent 50 further communicates the potentially altered dimensions in a manner indicating them as potentially altered according to the alteration of the target spatial dimension. In one aspect, packaging knowledgebase subcomponent 50 identifies a portion 51A (Verified Dimensions) of the potentially altered spatial dimensions to the user in a manner assigning responsibility to the user to verify those dimensions following alteration of the target dimension. In another aspect, packaging knowledgebase subcomponent 50 also communicates a portion 51B (Effected Dimensions) of the potentially altered spatial dimensions to the user in a manner expressing availability to the user of an opportunity to express a preference whether to allow a potentially altered spatial dimension to change. Thus, the user can input a preference, for example, by clicking with a mouse on a corresponding checkbox to identify whether the user wishes to "free" the parameter to change (unchecked), or "hold" the parameter (checked), thus maintaining the spatial dimension.

When a user expresses a preference 52A-52B (FIG. 1), dimension alteration function 38 is operable to preferentially maintain a first potentially altered spatial dimension while altering a second potentially altered spatial dimension based on the expressed preference. For example, if a user selected to "free" $1^{st}$ H To HeelVertical, and "hold" Couple Driver-$1^{st}$, while requiring a change in H To HeelVertical, then dimension alteration function 38 is operable to change H To HeelVertical and $1^{st}$H To HeelVertical based on the required change to H to Heel Vertical, and based on Couple Driver-$1^{st}$ being "held" or essentially constant. Dimensional inter-relationships 40 assist in this function by providing information on how dimensions inter-relate.

The information provided by dimensional inter-relationships 40 can take various forms. For example, dimensional inter-relationships 40 can be defined in terms of separate methods for modifying each target dimension, with a returnable list of potentially altered spatial dimensions developed for each target dimension. These methods can then use switch and/or if-else statements defining all the necessary cases for various combinations of checked boxes to preferentially alter dimensions in accordance with SAE specifications. The alteration can include use of formulas, maps, and/or lookup tables to arrive at a new value for a non-target dimension based on an alteration in a target dimension, and/or values of other dimensions, but corresponding values between dimensions according to various circumstances are well-known in the art of vehicle package design, so that this design aspect should be readily understood by one skilled in the art.

In another example, dimensional inter-relationships 40 can be defined in terms of functions for sequentially enqueueing changes to dimensions in accordance with expressed preferences and present and/or future values of various inter-related spatial dimensions. These changes can then be automatically implemented to modify various dimensions in sequence to achieve the desired result. Thus, in the previous example with Couple Driver-$1^{st}$ being "held" and $1^{st}$H to Heel Vertical being "free", the method could first change the target dimension (H To HeelVertical), and then change the "free" dimension ($1^{st}$ H To HeelVertical) to re-obtain the original value of the "held" dimension (Couple Driver-$1^{st}$). This latter technique essentially automatically performs all the steps a user would manually have to perform according to the prior art to achieve the desired result. Thus, since corresponding values between dimensions according to various circumstances are well-known in the art, this latter technique enables an easy conversion of an existing vehicle design package tool, such as that implemented with CATIA version 4, to accomplish the present invention.

In a presently preferred embodiment, the potentially altered dimensions for various target spatial dimensions are explained below. For example, for H30 (H To Heel Vertical), the Effected Dimensions include Couple Driver-$1^{st}$, $1^{st}$H To HeelVertical, Driver and First Vertical Offset, Heel To Spindle, and Wheelbase. Also, for H To Heel Vertical, the Verified Dimensions include up angle, down angle, head to siderail, head to header, legroom, headroom, hiproom, shoulder room, and belt height. Further, for H31 ($1^{st}$ H To Heel Vertical), the Effected Dimensions include Driver and $1^{st}$ Vertical Offset, $1^{st}$ and $2^{nd}$ Vertical Offset, $1^{st}$ Legroom, and $2^{nd}$ Legroom. Also, for 1st H To Heel Vertical, the Verified Dimensions include head to siderail, headroom, hiproom, shoulder room, and belt height. Still further, for H87 ($2^{nd}$H To Heel Vertical), the Effected Dimensions include Couple $1^{st}$-$2^{nd}$, $2^{nd}$H To HeelVertical, Driver and First Vertical Offset, Heel To Spindle, and Wheelbase. Also, for $2^{nd}$H To Heel Vertical, the Verified Dimensions include head to siderail, headroom, hiproom, shoulder room, and belt height. Yet further, for L50 (Couple Driver-$1^{st}$), the Effected Dimensions include Couple $1^{st}$-$2^{nd}$. Also, for Couple Driver-$1^{st}$, the Verified Dimensions include head to siderail, legroom, headroom, hiproom, shoulder room, and belt height. Yet still further, for $1^{st}$-$2^{nd}$ Vertical Offset, the Effected Dimensions include $1^{st}$H To Heel Vertical, $2^{nd}$H To Heel Vertical, $1^{st}$ Legroom, and $2^{nd}$ Legroom. Also, for $1^{st}$-$2^{nd}$ Vertical Offset, the verified dimensions include head to siderail, headroom, hiproom, shoulder room, and belt height. It should be readily understood that additional and/or alternative configurations of inter-relationships may also be implemented, whether for automobiles, other types of vehicles, or non-vehicular products.

It should be noted that the Effected Dimensions and Validated Dimensions can change based on preferences expressed by the user. For example, if the user selects H to HeelVertical as the target dimension and does not select to hold Couple Driver-$1^{st}$, then the legroom for the second rear passenger would not need to be verified. If, however, the user selected to hold Couple Driver-$1^{st}$, then the legroom for the second rear passenger would be affected by a change in H to HeelVertical, and would need to be verified. Similarly, check boxes for some Effected Dimensions can become active or inactive based on whether other checkboxes have been selected, and dimensions can alternatively or additionally be adaptively added to or removed from the GUI subcomponent as the user selects and deselects various interrelated combinations of checkboxes.

An additional feature of component 10 relates to communication of scalar values associated with one or more potentially altered spatial dimensions to the user. For example, packaging knowledgebase subcomponent 50 is operable to communicate present values of Effected Dimensions eligible for preference at portion 51B. Further, component 10 is operable to communicate output dimensions 54 that correspond to dimensions that will take affect in accordance with a required change to a target dimension, based on the expressed preferences. A prediction of the future values can be made, for example, by creating a potential digital vehicle package based on the current digital vehicle package, the required change to the target dimension, and the expressed preferences. A decision to apply the changes would simply replace the current digital vehicle package with the potential digital vehicle package, while a decision to change a preference, target value, and/or required change would replace the potential digital vehicle package with another potential digital vehicle package. Thus, in accordance with the presently preferred embodiment, a user can view a present value of a potentially changed dimension via packaging knowledgebase subcomponent 50, and a potential value of the same or another potentially changed dimension via output dimensions 54. As a result, a user can experiment with changes and perceive results before applying those changes to current digital vehicle package 24 (FIG. 1). It follows that a user can view two total vehicle spaces simultaneously according to the present invention, wherein the first total vehicle space is a current vehicle space, and the second vehicle space is a future and/or potential vehicle space in accordance with a desired change to a target dimension and one or more expressed preferences.

Further in accordance with the present invention, system 10 is operable to save current digital vehicle package 24 as at 56 as a new digital vehicle package 58 in data store 12. This option can be exercised repeatedly as the user modifies current digital vehicle package 24, so that multiple designs can be saved, printed, or otherwise output by system 10. Thus, system 10 is useful for quickly and easily designing multiple digital vehicle packages by adapting to frequent design and engineering changes in an automated fashion in accordance with user preferences.

Figure 6:
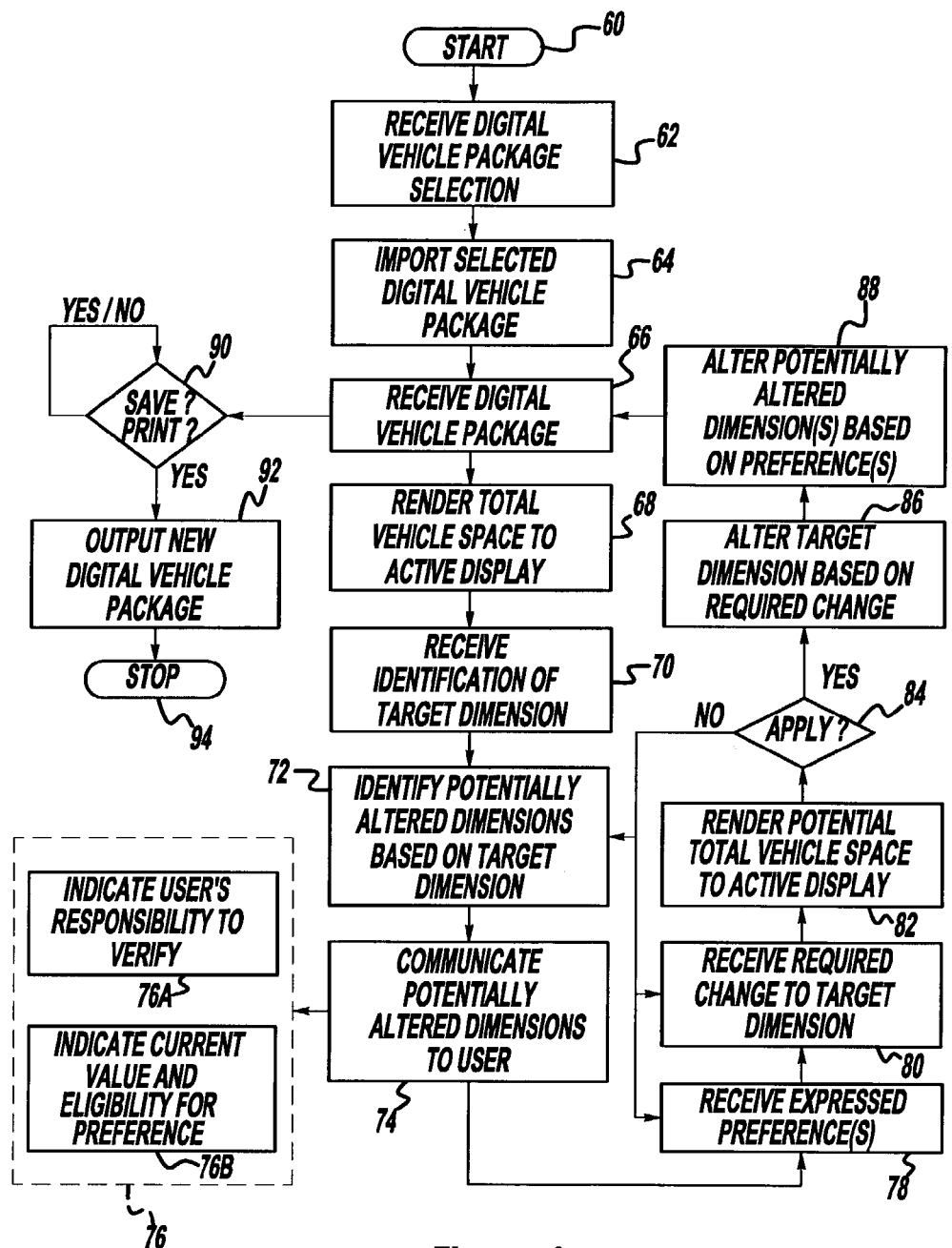
FIG. 6 is a flow diagram depicting a method of designing a vehicle package in accordance with the present invention.

The method of the present invention is illustrated in FIG. 6, and begins at 60. Accordingly, a digital vehicle package selection is received at step 62, and a corresponding digital vehicle package is imported at step 64. The digital vehicle package thus received at step 66 is used to render a total vehicle space to an active display at step 68. An identification of a target dimension received at step 70 is used to identify potentially altered spatial dimensions at step 72, which are communicated to the user at step 74. According to various aspects of the invention as at 76, the dimensions can be communicated in different ways. For example, a portion of the dimensions are communicated in a manner that specifies that user's responsibility to verify the dimensions at sub-step 76A. Also, a portion of the dimensions are communicated in a manner that indicates a current value of the dimensions and their eligibility for a preference at substep 76B.

Accordingly, user preferences are received at step 78, and a required change to the target dimension is received at step 80. A potential total vehicle space is then rendered to the active display at step 82 and the user can either apply the changes as at 84, or return to steps 72, 78, and/or 80. Once the user selects to apply the changes, the target dimension is altered according to the required change at step 86, and one or more of the potentially altered spatial dimensions is preferentially modified based on the alteration of the target dimension and the expressed preferences at step 88. The method then returns to step 66, where the modified digital vehicle package is deemed received as the current vehicle package. At any time, the user can elect as at 90 to save, print, or otherwise output the current digital vehicle package as a new vehicle package at step 92. The method ends at 94.

The present invention is generally described above with reference to a vehicle package design tool, and is particularly described above with reference to automobile package design. It should be readily understood, however, that the present invention may be implemented in a form for designing vehicle packages of types other than automobile packages. Further, it should be readily understood that the present invention may be implemented in a form for designing product packages of a type other than vehicle packages. In particular, application, implementation, and/or modification of the present invention may occur in response to shifts in availability of technology, business practice, and market forces. Moreover, the description of the preferred embodiment is intended to be illustrative of the present invention, and not to limit the scope of the present invention. Thus, variations that do not depart from the spirit and scope of the present invention are intended to be disclosed herein, and are further claimed as the present invention.

What is claimed is:

1. A vehicle package design system, comprising:
   a data store of vehicle packages defined in terms of spatial dimensions relating vehicle hard points;
   a design engine operable to visually render a vehicle space based on a vehicle package, wherein said design engine is operable, in response to user input defining a required change in a target spatial dimension, to alter the target spatial dimension according to the required change, and to alter at least one potentially altered spatial dimension of a plurality of potentially altered spatial dimensions based on alteration of the target spatial dimension; and
   a user interface having an output operable to communicate the plurality of potentially altered spatial dimensions to the user in a manner indicating tern as potentially altered according to the alteration of the target spatial dimension.

2. The system of claim 1, wherein said output is further operable to communicate a portion of the plurality of potentially altered spatial dimensions to the user in a manner assigning responsibility to the user to verify dimensions of the first portion following alteration of the target dimension.

3. The system of claim 1, wherein said output is further operable to communicate scalar values associated with a portion of the plurality of potentially altered spatial dimensions to the user.

4. The system of claim 1, wherein the at least one potentially altered spatial dimension corresponds to non-target spatial dimensions eligible for alteration based on alteration of the target spatial dimension.

5. The system of claim 1, further comprising an active display to which said design engine visually renders the product space.

6. The system of claim 1, further comprising an index and retrieval system adapted to store an altered product package in said data store as a new product package, and to retrieve the new product package in response to a user query.

7. The system of claim 1, further comprising an output operable to communicate an altered vehicle package as a new vehicle package.

8. A vehicle package design system, comprising:
   a data store of vehicle packages defined in terms of spatial dimensions relating vehicle hard points;
   a design engine operable to visually render a vehicle space based on a vehicle package, wherein said design engine is operable, in response to user input defining a required change in a target spatial dimension, to alter the target spatial dimension according to the required change, and to alter at least one potentially altered spatial dimension of plurality of potentially altered spatial dimensions based on alteration of the target spatial dimension; and
   a user interface having an output operable to communicate the plurality of potentially altered spatial dimensions to the user in a manner indicating them as potentially altered according to the alteration of the target spatial dimension.
   wherein said user interface further has an input adapted to accept user input defining an expressed preference whether to allow a potentially altered spatial dimension to change, and said design engine is further operable to preferentially maintain a first potentially altered spatial dimension while altering a second potentially altered spatial dimension based on the expressed preference.

9. The system of claim 8, wherein said output is further operable to communicate scalar values associated with a portion of the plurality of potentially altered spatial dimensions to the user, wherein said scalar values correspond to dimensions that will take effect in accordance with a required change to a target dimension, based on the expressed preferences.

10. A method of designing a product package, comprising:
    receiving a product package defined in terms of spatial dimensions relating product feature points;
    receiving a user input identifying a target spatial dimension,
    identifying a plurality of potentially altered spatial dimensions corresponding to non-target spatial dimensions eligible for potential alteration based on alteration of the target spatial dimension; and
    communicating the plurality of potentially altered spatial dimensions to the user in a manner indicating them as eligible for potential alteration.

11. The method of claim 10, further comprising receiving a user input defining a required change to the target spatial dimension.

12. The method of claim 11, further comprising altering the target spatial dimension according to the required change.

13. The method of claim 12, further comprising altering at least one potentially altered spatial dimension of the plurality of potentially altered spatial dimensions based on alteration of the target spatial dimension.

14. The method of claim 10, further comprising communicating a portion of the plurality of potentially altered spatial dimensions to the user in a manner assigning responsibility to the user to verify dimensions of the first portion following alteration of the target dimension.

15. The method of claim 10, wherein said step of receiving a product package further corresponds to receiving a vehicle package defined in terms of spatial dimensions relating vehicle hard points.

16. A method of designing a product package comprising:
    receiving a product package defined in terms of spatial dimensions relating product feature points;
    receiving a user input identifying a target spatial dimension.
    identifying a plurality of potentially altered spatial dimensions corresponding to non-target spatial dimensions eligible for potential alteration based on alteration of the target spatial dimension:
    communicating the plurality of potentially altered spatial dimensions to the user in a manner indicating them as eligible for potential alteration:
    receiving a user input defining an expressed preference whether to allow a potentially altered spatial dimension to change; and preferentially maintaining a first potentially altered spatial dimension while preferentially altering a second potentially altered spatial dimension based on the expressed preference and alteration of the target spatial dimension according to the required change.

17. The method of claim 16, further comprising communicating present scalar values associated with a portion of the plurality of potentially altered spatial dimensions to the user.

18. The method of claim 17, further comprising communicating potential scalar values associated with a portion of the plurality of potentially altered spatial dimensions to the user, wherein said potential scalar values correspond to dimensions that will take affect in accordance with a required change to a target dimension, based on the expressed preferences.

* * * * *